United States Patent [19]

Steer et al.

[11] Patent Number: 5,076,142
[45] Date of Patent: Dec. 31, 1991

[54] BRAKE BOOSTER WITH TANDEM PISTONS HAVING ANNULAR AND RADIAL REINFORCING RIBS AND CONNECTED BY HOOKS AND SLOTS

[75] Inventors: John E. Steer; Thomas E. Dodd, both of South Bend, Ind.

[73] Assignee: Allied-Signal Inc., Morristown, N.J.

[21] Appl. No.: 615,091

[22] Filed: Nov. 19, 1990

[51] Int. Cl.⁵ ............................................. F15B 9/10
[52] U.S. Cl. .................... 91/369.3; 92/99; 92/128
[58] Field of Search .................. 911/369.1–369.4; 92/128

[56] References Cited

U.S. PATENT DOCUMENTS

| | | | |
|---|---|---|---|
| 3,385,167 | 5/1968 | Wilson et al. | |
| 3,388,635 | 6/1968 | Hager | 92/48 |
| 3,760,693 | 10/1973 | Myers | 92/48 |
| 3,813,992 | 6/1974 | Brown | 92/48 |
| 4,366,744 | 1/1983 | Katagiri et al. | 91/369.4 |
| 4,393,749 | 7/1983 | Miyazaki | 91/369.2 |
| 4,394,833 | 7/1983 | Weiler et al. | 91/369.2 |
| 4,512,237 | 4/1985 | Endoh et al. | |
| 4,881,452 | 11/1989 | Newhouse | 92/48 |

FOREIGN PATENT DOCUMENTS 1954625  5/1971  Fed. Rep. of Germany ..... 91/369.1
2116270  10/1983  United Kingdom ............... 91/369.2

Primary Examiner—Edward K. Look
Assistant Examiner—F. Daniel Lopez
Attorney, Agent, or Firm—Leo H. McCormick, Jr.; Ken C. Decker

[57] ABSTRACT

A servomotor having a partition for separating a first chamber from a second chamber. The partition has a hub with passages therein connecting the first and second chambers with each other and to the atmosphere. The partition has a plurality of concentric annular ribs and radial ribs to strengthen a radial disc that extends from the hub. A valve carried in said hub controls the communication of turbulent free air to the second chamber to create a pressure differential for moving the partition and developing an output force in response to an operator input. This same pressure differential acts on a diaphragm connected to the radial disc to seal a plurality of openings in the radial disc to assure that the pressure differential is not reduced by leakage through the openings.

9 Claims, 4 Drawing Sheets

BRAKE BOOSTER WITH TANDEM PISTONS HAVING ANNULAR AND RADIAL REINFORCING RIBS AND CONNECTED BY HOOKS AND SLOTS

This invention relates to a partition for separating the interior of a shell into first and second chambers. The partition has a hub with a radial disc that has a series of concentric annular ribs and radial ribs. The radial disc has a plurality of axial openings located adjacent one of the concentric annular ribs. A diaphragm has a first bead fixed to the shell and a second bead located on one of the concentric annular ribs. A valve carried by said hub allows air to enter the second chamber and create a pressure differential for maintaining the second bead against the radial disc to prevent communication of air through the plurality of openings.

Servomotors are commonly used in brake systems to provide an assist in actuating a master cylinder to effect a brake application. In internal combustion engines, it is common practice to use servomotors which are operated by a pressure differential created by vacuum and air. The pressure differential acts across a movable wall attached to an output member. The movable wall usually consists of a metal backing plate and a diaphragm which are held together on a hub member. U.S. Pat. Nos. 3,517,588 and 3,754,450 provide an illustration of this type of servomotor.

In an effort to reduce the weight of a vacuum servomotor, it has been suggested that the housing of the servomotor could be made of a material such as plastic rather than being stamped from a sheet of metal. U.S. Pat. No. 4,270,353 disclosed such a servomotor wherein the housing is made of a plastic or light weight aluminum. In this type material, bolts extend through the movable wall to carry reaction loads from the master cylinder to the mounting structure. This type of servomotor has not generally been accepted because of the cost of such light weight materials and the need to maintain structural integrity when the environmental temperature is above 400° F.

In an effort to reduce the weight of the internal components of a servomotor and provide a common hub that could be used for many different servomotors, it was disclosed in U.S. Pat. No. 3,958,497 that a series of different metal backing plates and diaphragms could be attached to a plastic hub to establish a family of different sized servomotors. This type servomotor operates in an acceptable manner and is used in many brake systems although since this initial patent issued improvements have been made in the valve structure, most notable in the functional operation as disclosed in U.S. Pat. No. 4,953,446 and U.S. Pat. No. 4,970,939.

Structural analysis of the partition of a servomotor would indicate that certain areas are over designed while the size of other areas are necessary to carry the loads developed during a brake application. In an effort to optimize the structure of various components in a servomotor, we have developed a partition means which offers a reduction in weight and yet is capable of carrying loads that are developed during a brake application without developing a structural failure.

In the servomotor, the front shell is joined to the rear shell to form a closed housing. The interior of the housing is divided into a front chamber and a rear chamber by a wall means. The wall means has a hub with an axial projection that extends through said rear shell. The axial projection has a bore therein with a first opening connected to the first chamber, a second opening connected to the second chamber and an axial opening connected to the surrounding environment. The hub has a seat located in the bore between the first and second openings. A radial disc integral with the hub extends to a peripheral surface adjacent the wall of the housing. The radial disc has a varying thickness from the base to the peripheral surface and a plurality of concentric annular ribs and radial ribs to provide strength. In addition, the radial disc has a plurality of opening extending therethrough between one of the concentric annular ribs and peripheral surface to further reduce the overall weight of the hub. A diaphragm has a first bead which forms a first seal on one of said front and second shells and a second bead located on the annular rib adjacent the openings in said radial disc. A plunger and a flexible member located in the bore are urged toward the first seat by a resilient member. The plunger responds to an input signal by moving from the flexible member to allow the flexible member to engage the first seat and interrupt communication with the first chamber through the first opening. Further movement of the plunger allows air from the environment to flow over a semi-spherical surface on the plunger from the bore to the second chamber by way of the second opening. With the first chamber connected to a source of vacuum, a pressure differential is created across the wall means. The pressure differential causes the wall means to move and provide a force for an output member which extends through the front shell. The pressure differential acts on the second bead to create a force that maintains the second bead against a lip in the radial disc to prevent communication of air through the plurality of openings.

It is therefor an object of this invention to provide a servomotor with a wall means having a hub with an integral radial disc having a plurality of annular concentric ribs and radial ribs. A plurality of openings extend through the radial disc adjacent one of the concentric ribs in alignment with a corresponding plurality of stops on the radial disc. The bead of a diaphragm located on the concentric rib engages a lip in the radial disc to prevent communication through the openings whenever pressure differential is created in the servomotor.

It is a further object of this invention to provide a servomotor having a partition with a hub and integral radial disc. A valve located in the hub has a plunger with a semi-spherical seat to control the flow of air to a chamber through which an operational pressure differential is produced.

It is a further object of this invention to provide a light weight servomotor through the use of a total plastic partition through which force is developed to effect a brake application, the partition being reinforced by a plurality of annular rib and radial ribs to withstand the force without a structural failure.

These and other objects should be apparent from reading this specification while viewing the drawings.

Figure 1:
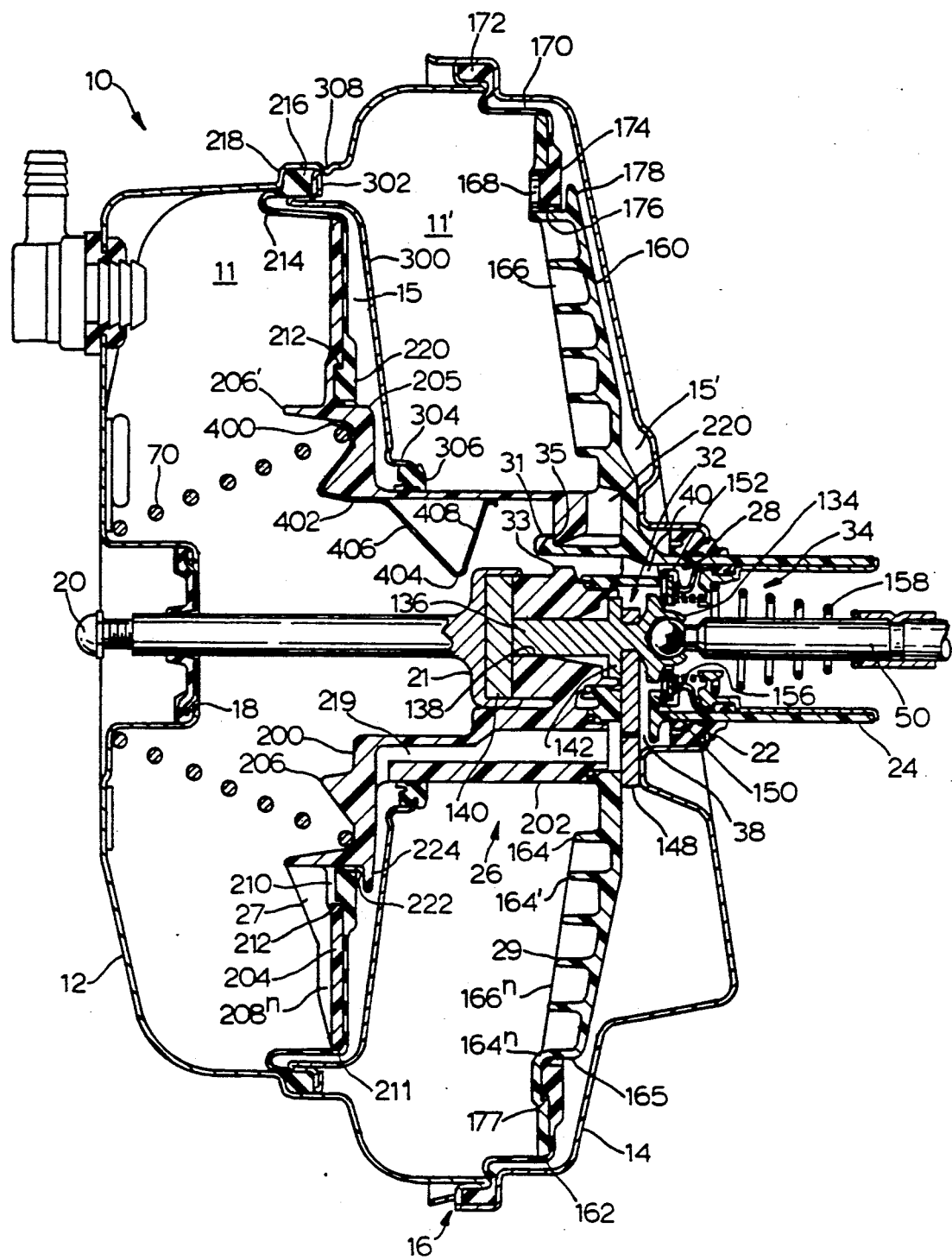
FIG. 1 is a sectional view of a servomotor having a partition means therein which separates the interior thereof in accordance with the principles of this invention.

The servomotor 10 shown in FIG. 1 has a front shell 12 joined to a rear shell 14 through a twist lock means 16 to form a sealed cavity within the housing. The front shell 12 has an axial opening 18 through which a push rod 20 extends to supply a master cylinder (not shown) with an operative force in response to an input force. The rear shell 14 has an axial opening 22 through which a continuous cylindrical axial projection 24 from a partition means 26 extends to provide communication from the surrounding environment to the interior of the housing.

Figure 2:
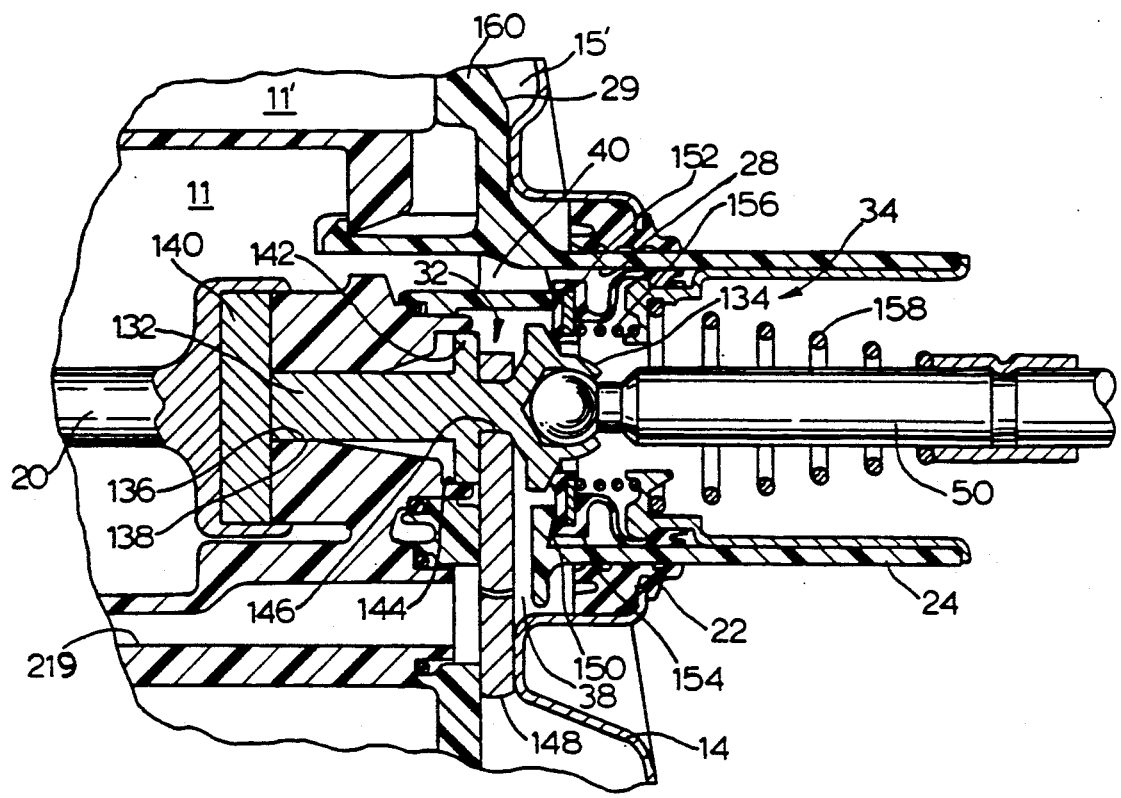
FIG. 2 is an enlarged view of the control valve for operating of the servomotor of FIG. 1.
Figure 4:
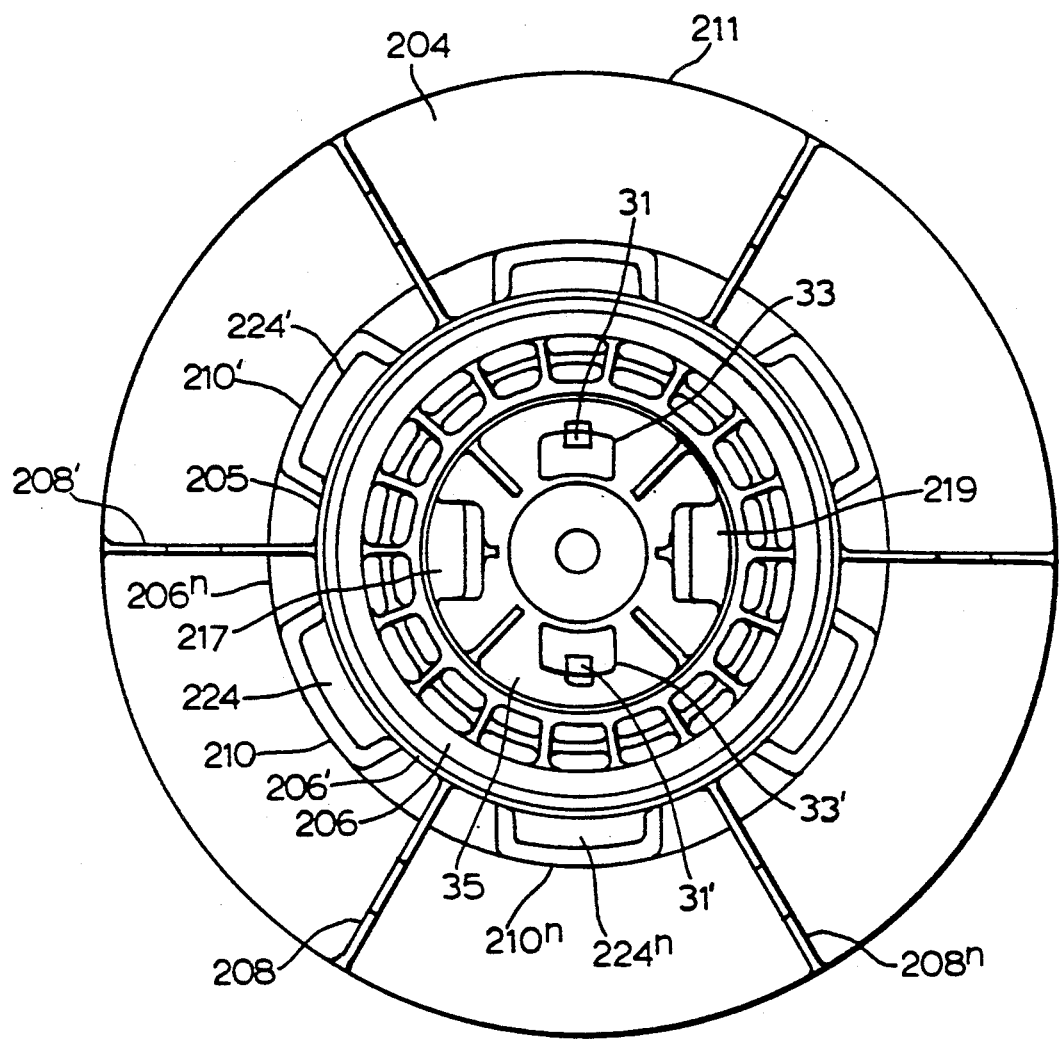
FIG. 4 is an end view looking at the annular reinforcing ribs and radial ribs.

The partition means 26 is made up of two components, a front section 27 and a rear section 29. The front and rear sections 27 and 29 form walls which separate the interior into front chambers 11, 11' and rear chambers 15, 15'. The rear section 29 has a series of hooks 31 that extend therefrom while the front section has a corresponding slots 33 thereon, as best seen in FIG. 4. The rear section 29 is joined to the front section 27, when hooks 31 are resilient expanded radially and snapped onto ledge 35. The rear section 29 has an internal bore 28 into which plunger means 32 and poppet means 34 are sequentially located, as best shown in FIG. 2. The plunger means 32 has a cylindrical body 132 with a semi-spherical head 134 attached thereto. Cylindrical body 132 has a first diameter section 136 located in an opening 138 in the rear section 29 for receiving a reaction force through disc 140 from push rod 20, a second diameter section 142 for engaging bearing surface 144 on rear section 29 for maintaining the cylindrical body 132 in axial alignment in bore 28, and a third diameter 146 located between head 134 and second diameter 142. The third diameter 146 accepts a key 148 of the type disclosed in U.S. Pat. No. 4,953,446 located in opening 38 to retain the plunger 32 in bore 28. The rear section 29 has an annular seat 150 located at the end of opening 40 and with semi-spherical head 134 controls the communication of air through bore 28 to opening 38 on engagement of face 152 of the flexible member 154 of poppet means 34. A spring 156 acts on the flexible member 154 to urge face 152 toward seat 150 and semi-spherical head 134 while return spring 158 urges input push rod 50 toward the rest position shown in FIG. 1.

The rear section 29 has a radial disc 160 integral with the hub section that extends from the cylindrical rear projection 24 to a peripheral surface 162. Radial disc 160 has a plurality of concentric annular ribs 164, 164' . . . 164$^n$ and radial ribs 166, 166' . . . 166$n$ to provide strength for the radial disc 160 whose thickness can vary from the base adjacent the rear projection 24 to the peripheral surface 162. The radial disc 160 has an annular lip 165 concentric to at least one of said annular ribs 164, 164' . . . 164$^n$ and a plurality of openings 168, 168' . . . 168$^n$, only one being shown in FIG. 1, to further reduce the weight of the rear section 29 which extending therethrough between the annular lip 165 and peripheral surface 162. A diaphragm 170 has a first bead 172 located in the twist lock 16 which forms a first seal between the front 12 and rear 14 shells and a second bead 174 located on annular rib 165. The second bead 174 has a flap 176, see FIG. 5, that engages annular rib 165 to provide radial sealing of the diaphragm 170 on the radial disc 160. Radial disc 160 has a plurality of stops 178, 178' . . . 178$^n$, only one being shown, located on annular lip 165 which are axially aligned with the plurality of openings 168, 168' . . . 168$^n$ to aid in maintaining bead 174 of diaphragm 170 on annular rib 166.

Figure 5:
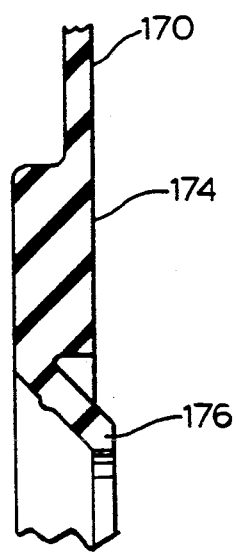
FIG. 5 is an enlarged view of the bead of the diaphragm showing the flap that aids in holding the bead on the partition means of FIG. 1.
Figure 3:
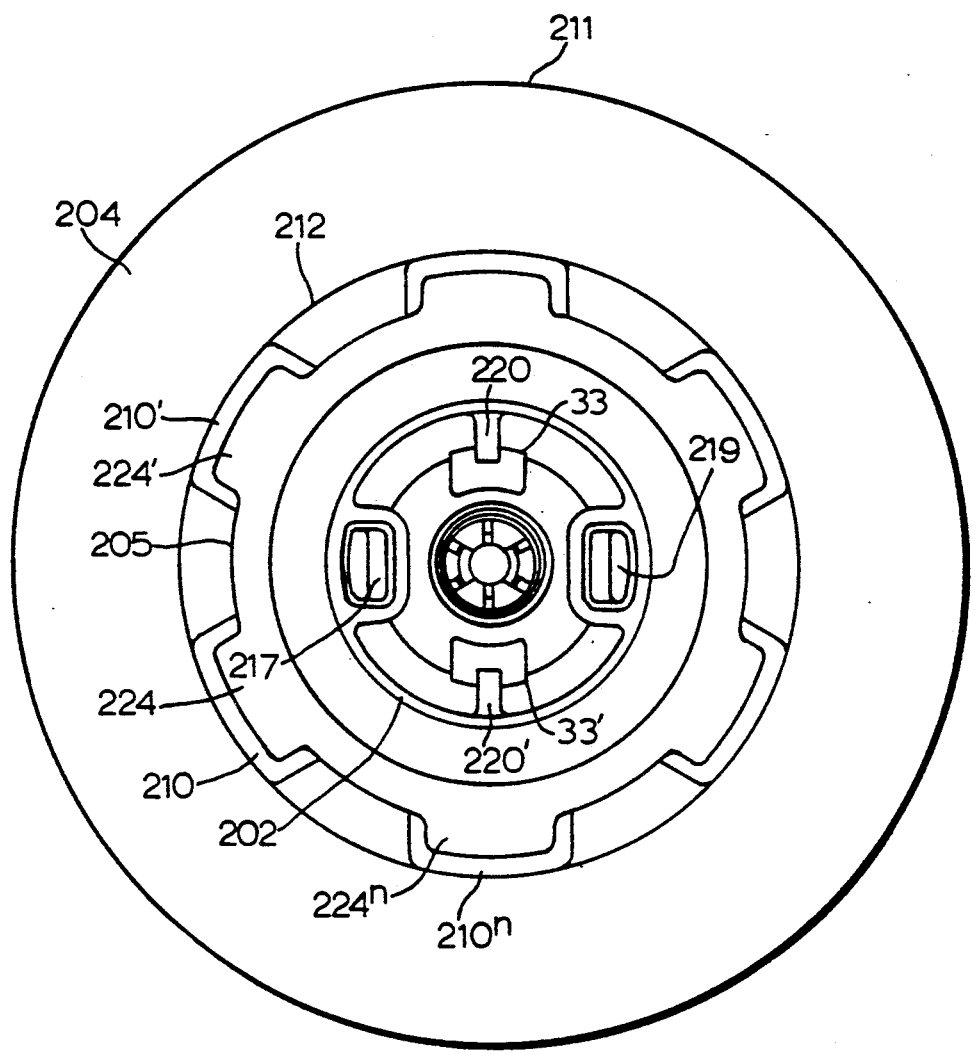
FIG. 3 is an end view of the front segment of the partition means.

The front section 27 of the partition means 26 has a cylindrical member 200 with a base 202 having a plurality of slots 33, 33', as best shown in FIG. 4 and 5, which allow hooks 31, 31' to expand before resiliently snapping over ledge 35 and attach the front section 27 to the rear section 29 and form a unitary structure. The cylindrical member 200 has an integral formed radial disc 204 with a plurality of concentric annular ribs 206, 206' . . . 206$^n$ and radial ribs 208, 208' . . . 208$^n$ that extend to peripheral surface 211 to provide structural strength for the radial disc 204 while allowing the thickness of the radial disc 204 to vary from the base as it progresses to the peripheral surface 211. Radial disc 204 has a plurality of openings 210, 210' . . . 210$^n$ that extend therethrough adjacent concentric annular rib 206' and peripheral surface 211. Radial disc 204 has a concentric annular lip 212 which is located adjacent openings 210, 210' . . . 210$^n$. The front section 27 has a diaphragm 214 with a first bead 216 located against flange 218 in front shell 12 and a second bead 220 located on concentric lip 205 adjacent the plurality of openings 210, 210' . . . 210$^n$ in the radial disc 204. Bead 220 has a flap 222 which forms a seal on lip 205 to aid in securing the diaphragm 214 to the radial disc 204. Radial disc 204 has a series of stops 224, 224' . . . 224$^n$ located on annular lip 205 that also aids in holding bead 220 on lip 205. Cylindrical member 200 has a plurality of passages 217 and 219, see FIGS. 1, 2 and 3 that connect common rear chambers 15, 15' while the common front chambers 11, 11' are connected by openings or slots 220 and 220' in base 202.

Bead 216 on diaphragm 214 is held against flange 218 by separator plate 300. Separator plate 300 has a first ledge or flange 302 that engages first bead 216 of diaphragm 214 and a second ledge or flange 304 that positions seal 306 on the peripheral surface of cylindrical member 200 to prevent communication between front chamber 11' and rear chamber 15. Ledge 302 is retained in the front shell 12 by a series of detents 308 that are placed in the front shell 12 during the assembly of the servomotor 10.

A retainer 402 has a base 400 that is located between concentric annular ribs 206 and 206' on cylindrical body 200 to distribute forces from return spring 70. Retainer 402 has a series of fingers or tabs 404 that extend into cylindrical body 200 to retain head 21 of push rod 20 in contact with reaction disc 140. Because of the slope of leg 406, head 21 on insertion into cylindrical body 200 easily moves past fingers or tabs 404 but the sharp angle of leg 408 requires a much larger force to compress the fingers or tabs 404 and as a result once push rod 20 is placed in the assembly it is retained therein. Fingers or tabs 404 and base 400 could be molded into cylindrical member 200 and as a result the time required to assemble the components may be reduced.

To effect a brake application, plunger 32 responds to an input signal by moving away from face 152 on the flexible member 34. Spring 156 moves face 152 toward seat 150 to seal passages from front chambers 11, 11' from bore 28 and allows air present in bore 28 to flow from the environment over a semi-spherical head 134 without turbulence on the plunger 34 the second chambers 15, 15' by way of the second opening 3B. With the first chambers 11, 11' connected to a source of vacuum, a pressure differential is created across the radial discs 160 and 204 of the front and rear sections 27 and 29 of the partition means 26 to provide a force for an p...; rod 20. This pressure differential acts on beads 200 and 174 to urge the same against radial disc 204 and 160 to seal openings 210, 210' ... 210$^n$ and 168, 168' ... 168$^n$ at the same time radial lips 212 and 177 engage beads 220 and 174 to assure that flaps 222 and 176 remain on lips 205 and 165 to assure that chambers 11, 11' and 15, 15' are sealed from each other during a brake application.

The partition means 26 shown in FIG. 1 for use in a tandem brake booster or servomotor 10 could also be used in a single brake booster with the same effective reduction in weight.

We claim:

1. In a servomotor having a front shell joined to a rear shell and separated by a wall means to define a first chamber and a second chamber, a valve carried by said wall means through which said first chamber is communicated to said second chamber, said wall means being characterized by a hub with an axial projection that extends through said rear shell, said axial projection having a bore therein, said bore having a first opening connected to said first chamber, a second opening connected to said second chamber and an axial opening connected to the surrounding environment, said hub having a first seat located between said first and second openings, said hub having a radial disc extending therefrom to a peripheral surface, said radial disc having a plurality of concentric annular ribs and radial ribs, said radial discs having an annular lip concentric to at least one of said annular ribs and a plurality of opening extending therethrough between said annular lip and said one annular rib, a diaphragm having a first bead which forms a first seal on one of said front and second shells and a second bead located on said one annular rib adjacent said openings in said radial disc, said second bead having an annular flap that engages said annular rib to form a seal, and valve means located in said bore, said valve means having a plunger an a flexible member, said flexible member being urged toward said plunger and first seat, said plunger being responsive to an input signal by moving from said flexible member to allow said flexible member to engage said first seat to interrupt communication with said first opening and thereafter allow air from the environment to flow through said bore to said second chamber by way of said second opening, said first chamber being connected to a source of vacuum to create a pressure differential across said wall means, said pressure differential causing said wall means to move and provide a force for an output member that extends through said front shell, said pressure differential acting on said second bead and creating a force that maintains the second bead against said lip to prevent communication of air through said plurality of openings in said radial disc.

2. The servomotor as recited in claim 1 wherein said wall means includes:
   a first partition; and
   a second partition, each of said first and second partitions cooperating to define said first and second chambers within said first and second shell.

3. The servomotor as recited in claim 1 wherein said wall means further includes:
   a resilient member that prevents said output member from being removed from said front chamber without exerting a predetermined force.

4. The servomotor as recited in claim 3 wherein said plunger of said valve means includes:
   a semi-spherical head attached to a cylindrical body, said cylindrical body having a first diameter section for receiving a reaction force from said output member, a second diameter section for engaging said hub to maintain said cylindrical body in axial alignment in said bore, and a third diameter located between said head and second diameter, said semi-spherical head forming a second seat on engagement with said flexible member to prevent communication through said bore to said second opening.

5. The servomotor as recited in claim 4 wherein said semi-spherical head on movement away from said flexible member directs the flow of air into said second opening without the creation of turbulence.

6. In a servomotor having a front shell joined to a rear shell and separated by a wall means to define first and second chambers therein, a valve means carried by said wall means through which said first chamber is connected to said second chamber, said wall means comprising:

a first partition that includes a hub having an axial projection extending through said rear shell, said hub having at least a pair of flexible hooks that extend from a first face, said axial projection having an axial bore with a first opening connected to said first chamber and a second opening connected to said second chamber, said hub having a first radial disc extending therefrom with a series of annular ribs that extend substantially to a first annular peripheral surface and a corresponding series of radial ribs that extend toward said first peripheral surface, said first radial disc having a first concentric annular ledge located adjacent said first peripheral surface, said first ledge having a first plurality of radial stops thereon, said first partition further including a first diaphragm with a first bead located between said first and second shell and a second bead located on said first concentric ledge between said peripheral surface and said first plurality of radial stops;

a second partition that includes a cylindrical member having a base with a plurality of slots therein, said hooks on said first partition extending through said slots to connect said cylindrical member with said hub, said cylindrical member having a second radial disc with a plurality of concentric annular ribs and radial ribs that extend to a second peripheral surface, said second radial disc having a second concentric annular ledge located adjacent said second peripheral surface, said second ledge having a second plurality of radial stops thereon, said second partition further including a second diaphragm with a first bead adjacent said front shell and a second bead located on said second concentric annular ledge between said peripheral surface and said second plurality of radial stops; and a separator plate having a first ledge that engages said first bead of said second diaphragm and a second ledge that positions a seal on said cylindrical member for separating said first partition from said second partition, said valve means being located in said bore and responsive to an operator input for allowing air from the environment to flow into said second chamber through said second opening and create a pressure differential with vacuum in said first chamber, said pressure differential acting on said first and second partitions to develop a force that is transmitted through said hub to an output member, said pressure differential acting on said first and second diaphragms to hold said second beads thereon against said first and second ledges to prevent communication of air around the first and second peripheral surfaces of said first and second partitions.

7. In a servomotor having a front shell joined to a rear shell and separated by a wall means to define first and second chambers therein, a valve means carried by said wall means through which said first chamber is connected to said second chamber said wall means comprising:

a first partition that includes a hub having an axial projection extending through said rear shell, said hub having at least a pair of flexible hooks that extend from a first face, said axial projection having an axial bore with a first opening connected to said first chamber and a second opening connected to said second chamber, said hub having a first radial disc extending therefrom with a series of annular ribs that extend substantially to a first annular peripheral surface and a corresponding series of radial ribs that extend toward said first peripheral surface, said first radial disc having a first plurality of openings that extend therethrough between one of said concentric ribs and peripheral surface, said first radial disc having a first concentric annular lip between said first plurality of openings and said peripheral surface, said first partition further including a first diaphragm with a first bead that is located between said first and second shell and a second bead that is located on said first concentric annular lip adjacent said first plurality of openings in said first radial disc;

a second partition that includes a cylindrical member having a base with a plurality of slots therein, said hooks extending through said slots to connect said cylindrical member with said hub, said cylindrical member having a second radial disc with a plurality of concentric annular ribs and radial ribs that extend to a second peripheral surface, said second radial disc having a second plurality of openings that extend therethrough between one of said concentric annular ribs and said second peripheral surface, said second radial disc having a second concentric annular lip located between said second plurality of openings and said second peripheral surface, said second partition further including a second diaphragm with a first bead adjacent said front shell and a second bead located on said second concentric annular lip adjacent said second plurality of openings in said second radial disc; and a separator plate having a first flange that engages said first bead of said second diaphragm and a second flange that positions a seal on said cylindrical member, said separator plate separating said first partition from said second partition, said valve means being located in said bore and in response to an operator input allowing air from the environment to flow into said second chamber through said second opening and create a pressure differential with vacuum in said first chamber, said pressure differential acting on said first and second partitions to develop a force that is transmitted through said hub to an output member, said pressure differential acting on said first and second diaphragms to move said second beads thereon against said first and second lips to prevent communication of air through said first and second plurality of openings in said first and second radial disc.

8. The servomotor as recited in claim 7 wherein said second beads on said first and second diaphragms includes:

a flap that engages said one of said plurality of concentric annular lips to form a sealing surface that aids in the separation of said first and second chambers.

9. The servomotor as recited in claim 8 wherein said first and second partitions each include a plurality of radial stops on said first and second concentric annular lips, said radial stops bring axially aligned with said first and second plurality of openings to aid in maintaining said first and second diaphragms on said first and second partitions, respectively.

* * * * *